Figure 1:
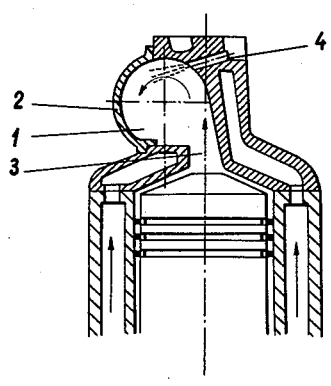

3,044,455
HOT BULB INTERNAL COMBUSTION ENGINE AND A METHOD OF OPERATING THE SAME
Alfréd Pápa, Géza Szilvay, and János Zombory, Budapest, Hungary, assignors to Licencia Lalalmanyokat Ertekesito Vallalat, Budapest, Hungary, a corporation of Hungary
Filed June 26, 1958, Ser. No. 744,853
1 Claim. (Cl. 123—32)

The present invention relates to a hot bulb internal combustion engine and a method of operating the same. The invention aims at further improving hot bulb ignition engines, particularly two-stroke cycle hot bulb internal combustion engines. As known, the efficiency of internal combustion engines improves with increasing compression ratio. However, in actual practice, the fuel consumption of an engine is also greatly affected by other factors, such as, more particularly, the quality of combustion, and the present invention is based upon the idea that, in certain types of engine, efficiency can be raised to a greater extent by improving combustion than by increasing the compression ratio. In this connection it may be said that, in hitherto conventional hot bulb engines, especially in two stroke cycle traction engines, combustion is very imperfect, and that a considerable proportion of the fuel is not ignited at the most favourable instant during the cycle. It has now been found that, if this difficulty can be at least partly overcome, very considerable economies can be effected in fuel consumption, so that an engine operating at the low compression ratio of say 1:5 will use about the same amount of fuel as a conventional diesel engine with a compression ratio of about 1:16. An important factor that must be considered is that a comparatively low final compression permits the engine to be of light construction since the forces generated are low and losses due to inertial effects and friction are lessened accordingly.

For improving combustion, theoretical considerations as well as extensive tests have revealed that the method hitherto practised wherein, the fuel jet is injected approximately perpendicularly to the direction of flow of the combustion air, is incorrect. Favourable conditions are achieved if the fuel jet and the air are codirectional. This means that the direction of injection should be more or less parallel with the tangent of the precombustion chamber outline. It is also important that injection should not be too far advanced and that it should not take place until the combustion gases from the preceding working cycle have been removed from the precombustion chamber; in other words, that the fuel should not be injected into combustion gases but rather into flowing fresh air. Another desirable factor is that the fuel should reach the hot wall along the shortest possible path and as quickly as possible.

If the fuel is injected into the hot residual combustion products and into hot air, as is the case in the known types of engine, some of the fuel will suddenly reach ignition temperature, combustion will proceed in the manner of an explosion, and the engine will tend to knock. Moreover, the combustion of some of the fuel will proceed at too low a rate if the instant of injection is too far advanced because, in the absence of sufficient oxygen, the fuel is thermally decomposed. Furthermore, the air entering the pre-combustion chamber through the transfer port tends to disperse the fuel jet, thus causing delay in the combustion of another part of the fuel. As a result of these various factors combustion is incomplete and combustion efficiency low.

In the system proposed by the present invention injection does not commence until all the combustion products have been removed from the point of injection, and, since the fuel jet does not cross the current of air, it is not thereby dispersed.

In an engine according to the invention, the temperatures are lower than in conventional engines so that there is no objection to the use of aluminum pistons. As already mentioned, inertial effects are greatly reduced by the light form of construction which the generation of low final pressures at the end of the compression stroke permits, and these inertial effects can be even further reduced by the employment of light metal pistons. Vibration is thus greatly reduced, a point of great importance, especially in the case of agricultural tractors.

Other features of the invention will be described with reference to illustrative forms of construction shown in the accompanying drawings.

Figure 2:
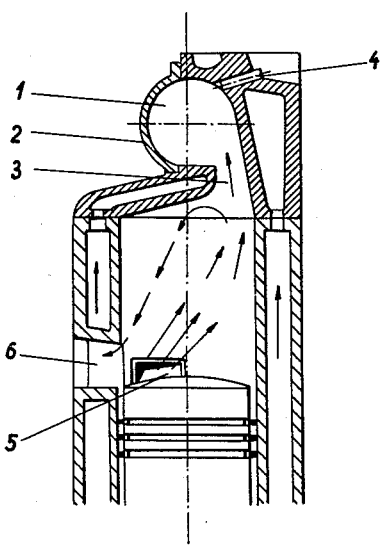

FIG. 1 is an axial section of the upper portion of a working cylinder constructed and arranged in accordance with the present invention and FIG. 2 is a similar section of a slightly modified embodiment of the invention.

As shown in FIG. 1, the spherical or quasi-spherical combustion chamber 1 is eccentrically located, its centre being displaced in relation to the centre line of the cylinder, although the transfer port 3 is centrally disposed. The uncooled portion 2 of the combustion chamber is detachable so that it can be readily disassembled and replaced by a fresh hot bulb. The crown of the piston is cambered and the cylinder head constructed accordingly. The fuel injection nozzle 4 is arranged opposite the upper portion of the uncooled surface 2. Since the scavenging air travels in the arrowed direction, the injection of the fuel is substantially in the direction of motion of the air. The injection system may therefore be described as a co-current system.

The drawing clearly shows that the entire quantity of injected fuel closely follows the arcuately curved path of the moving air which therefore fans the injected fuel over the hot surface 2 where complete combustion takes place. The fuel is induced to flow in the same direction as the moving air in that the centre line of the injection nozzle 4 is directed towards the upper half of the uncooled, substantially hemispherical, hot bulb 2. In other words, the fuel impinges upon that half of the hot bulb which is also first contacted by the current of air.

The embodiment illustrated in FIG. 2 differs from that shown in FIG. 1 merely in that the combustion chamber 1 is centralised, whereas the transfer port 3 is eccentrically disposed. The air flowing into the combustion chamber through the transfer port therefore enters the chamber tangentially. The path of the inflowing air, which is first straight, then arcuately curves so that the air will flow in co-current with the injected fuel.

5 is the air admission port, the air induction pipe, not shown in the drawing, which injects the air through this port, being so disposed that the air will enter in a direction pointing obliquely upwards towards the transfer port 3. This prevents the air from immediately escaping through the exhaust port 6. Moreover, the obliquity of air induction ensures that air flow along the walls of the combustion chamber will be substantially non-turbulent. In the drawing, the air induction port 5 is therefore placed to the left and the transfer port 3 to the right of the centre line of the cylinder.

To ensure satisfactory combustion the temperature of the uncooled surface is also a matter of primary importance. Hitherto the aim in hot bulb ignition engines was to maintain the temperature of the hot bulb as high as possible so that in the course of operation the bulb often became white hot or nearly white hot. Theoretical considerations as well as empirical tests carried out in connection with the present invention have shown that an excessive temperature of the hot wall is not desirable because it causes the fuel to crack, impairing combustion and leading to carbonization in the interior of the cylinder.

The temperature of the hot bulb is determined by the size of the transfer port 3. The greater the flow section through the transfer port, the more effectively will the hot bulb be cooled by the scavenging air. It has now been established that the ideal temperature for the hot bulb is 550° C. since, at this temperature, no adverse chemical changes occur in the fuel although its ignition is effected with certainty. It was also found that, to achieve this optimum temperature, the cross sectional area of the transfer port must be at least 4% of the internal surface area of the combustion chamber and that its optimum size is between 4.5 and 6% thereof.

It has been well established by test that, in hot bulb ignition engines in which the uncooled surface of the bulb is maintained at the hitherto normal temperature of about 700° C., the cylinder requires cleaning at the end of eight hours' service to remove the carbon deposits, whereas in an engine designed and operated according to the present invention, with the temperature of the hot bulb maintained at 550° C., there is practically no carbonisation at all. The awkward and costly work of decarbonisation can therefore be saved.

For the sake of completeness it may be mentioned that, when the transfer port has the above specified dimensions, the port will have a cross section of 20 sq. c. per litre capacity of the combustion chamber.

We claim:

In a hot bulb internal combustion engine including a working cylinder and a combustion chamber for the airfuel mixture: said chamber having a substantially hemispherical cooled half, and a substantially hemispherical uncooled half, the uncooled half forming the hot bulb; a substantially rectilinear air injection channel opening into said cooled half and having an outer flow-directing surface tangent to said cooled half at a point substantially in advance of the leading edge of said uncooled half, whereby the air is directed tangentially into said cooled half for circular and smooth flow over the surface thereof in advance of the leading edge of said uncooled half, the injected air, being in constant contact with smoothly merging guiding surfaces due to such tangential injection, having a smooth streamline flow avoiding the formation of eddies; and a fuel injection nozzle opening into said cooled half of the chamber and oriented to direct the entire quantity of the injected fuel into said cooled half and into the air already flowing circularly and smoothly over the surface of said cooled half, in the same direction as that of the air flow past the opening of the nozzle into said cooled half; said fuel nozzle opening being located immediately in advance of the leading edge of said uncooled half of said chamber, so that the jet of fuel is directed along the shortest possible arcuate path to the portion of the hot bulb first touched by the flowing air; said fuel jet entering the smoothly circularly flowing air stream from the radially outer surface thereof, whereby to prevent air entering between the fuel jet and the surface of the chamber to form eddies; said air injection channel having a cross section of 4% to 6% of the internal surface of the combustion chamber; whereby the temperature of the uncooled surface of the combustion chamber is maintained below 600° C.

References Cited in the file of this patent

UNITED STATES PATENTS

| 2,204,068 | Chapman | June 11, 1940 |
| 2,720,872 | Yokoi | Oct. 18, 1955 |
| 2,735,413 | Meyer | Feb. 21, 1956 |
| 2,907,308 | Meurer et al. | Oct. 6, 1959 |

FOREIGN PATENTS

| 579,214 | France | July 26, 1924 |
| 791,894 | France | Oct. 7, 1935 |
| 54,151 | France | Dec. 17, 1947 |
| | (2nd addition to No. 785,625) | |
| 680,321 | Germany | Aug. 26, 1939 |
| 175,740 | Italy | Mar. 7, 1951 |

OTHER REFERENCES

Mark's Handbook, 4th edition, 1941, McGraw-Hill Book Company, Inc., New York, page 296.